United States Patent
Seetzen et al.

(10) Patent No.: US 8,471,807 B2
(45) Date of Patent: Jun. 25, 2013

(54) CALIBRATION OF DISPLAYS HAVING SPATIALLY-VARIABLE BACKLIGHT

(75) Inventors: Helge Seetzen, Vancouver (AU); Lorne Whitehead, Vancouver (CA); Gregory John Ward, Albany, CA (US); Wolfgang Stuerzlinger, Ontario (CA); Chun-Chi Wan, Richmond (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 481 days.

(21) Appl. No.: 12/524,809

(22) PCT Filed: Feb. 1, 2008

(86) PCT No.: PCT/CA2008/000221
§ 371 (c)(1),
(2), (4) Date: Jul. 28, 2009

(87) PCT Pub. No.: WO2008/092276
PCT Pub. Date: Aug. 7, 2008

(65) Prior Publication Data
US 2010/0002026 A1    Jan. 7, 2010

Related U.S. Application Data

(60) Provisional application No. 60/899,098, filed on Feb. 1, 2007.

(51) Int. Cl.
G09G 3/34 (2006.01)
G09G 3/30 (2006.01)

(52) U.S. Cl.
USPC ............................ 345/102; 345/76

(58) Field of Classification Search
USPC .............................. 345/102, 76–83
See application file for complete search history.

(56) References Cited

U.S. PATENT DOCUMENTS

| | | | |
|---|---|---|---|
| 4,170,771 A | 10/1979 | Bly |
| 4,229,095 A | 10/1980 | Mir |
| 4,316,196 A | 2/1982 | Jacobs |
| 4,364,039 A | 12/1982 | Penz |
| 4,374,397 A | 2/1983 | Mir |

(Continued)

FOREIGN PATENT DOCUMENTS

| EP | 0730371 A2 | 9/1996 |
|---|---|---|
| EP | 0829747 A1 | 3/1998 |

(Continued)

OTHER PUBLICATIONS

Endo, N., "Transmissive Type Liquid Crystal Display Device", Toshiba Technical Publication Collection, vol. 14-16, Issue 96: 3642, Apr. 4, 1996.

(Continued)

*Primary Examiner* — Kevin M Nguyen
*Assistant Examiner* — Cory Almeida

(57) ABSTRACT

A display has a screen which incorporates a light modulator. The screen may be a front projection screen or a rear-projection screen. The screen is illuminated with light from an illuminator comprising an array of individually-controllable light sources. The light sources and elements of the light modulator may be controlled to adjust the intensity and frequency of light emanating from corresponding areas on the screen. The display may be calibrated to compensate for differences in intensities of the light sources.

29 Claims, 6 Drawing Sheets

U.S. PATENT DOCUMENTS

| | | | |
|---|---|---|---|
| 4,378,568 A | 3/1983 | Mir |
| 4,441,791 A | 4/1984 | Hornbeck |
| 4,559,480 A | 12/1985 | Nobs |
| 4,580,877 A | 4/1986 | Washo |
| 4,637,150 A | 1/1987 | Geluk |
| 4,726,663 A | 2/1988 | Buzak |
| 4,801,194 A | 1/1989 | Agostinelli et al. |
| 4,868,668 A | 9/1989 | Tavernetti |
| 4,933,754 A | 6/1990 | Reed |
| 4,954,789 A | 9/1990 | Sampsell |
| 4,987,410 A | 1/1991 | Berman et al. |
| 4,995,719 A | 2/1991 | Shanks |
| 5,075,789 A | 12/1991 | Jones |
| 5,103,328 A | 4/1992 | Numao |
| 5,122,791 A | 6/1992 | Gibbons |
| 5,144,292 A | 9/1992 | Shiraishi |
| 5,247,366 A | 9/1993 | Ginosar |
| 5,359,345 A | 10/1994 | Hunter |
| 5,386,253 A | 1/1995 | Fielding |
| 5,537,233 A | 7/1996 | Miura et al. |
| 5,537,256 A | 7/1996 | Fergason |
| 5,572,341 A | 11/1996 | Fergason |
| 5,592,193 A | 1/1997 | Chen |
| 5,639,158 A | 6/1997 | Sato |
| 5,646,702 A | 7/1997 | Akinwande |
| 5,652,672 A | 7/1997 | Huignard |
| 5,666,226 A | 9/1997 | Ezra |
| 5,684,354 A | 11/1997 | Gleckman |
| 5,715,029 A | 2/1998 | Fergason |
| 5,717,422 A | 2/1998 | Fergason |
| 5,724,062 A | 3/1998 | Hunter |
| 5,729,242 A | 3/1998 | Margerum |
| 5,748,828 A | 5/1998 | Steiner |
| 5,784,181 A | 7/1998 | Loiseaux |
| 5,809,215 A | 9/1998 | Heydinger |
| 5,815,303 A | 9/1998 | Berlin |
| 5,889,567 A | 3/1999 | Swanson |
| 5,892,325 A | 4/1999 | Gleckman |
| 5,933,754 A | 8/1999 | Mathews et al. |
| 5,954,789 A | 9/1999 | Yu et al. |
| 5,959,777 A | 9/1999 | Whitehead |
| 5,978,142 A | 11/1999 | Blackham |
| 5,986,628 A | 11/1999 | Tuenge |
| 6,043,591 A | 3/2000 | Gleckman |
| 6,054,120 A | 4/2000 | Burgoyne et al. |
| 6,111,559 A | 8/2000 | Motomura |
| 6,111,560 A | 8/2000 | May |
| 6,120,588 A | 9/2000 | Jacobson |
| 6,120,839 A | 9/2000 | Comiskey |
| 6,144,162 A | 11/2000 | Smith |
| 6,163,621 A | 12/2000 | Paik |
| 6,172,798 B1 | 1/2001 | Albert |
| 6,184,969 B1 | 2/2001 | Fergason |
| 6,215,920 B1 | 4/2001 | Whitehead |
| 6,243,055 B1 | 6/2001 | Fergason |
| 6,243,068 B1 | 6/2001 | Evanicky |
| 6,268,843 B1 | 7/2001 | Arakawa |
| 6,276,801 B1 | 8/2001 | Fielding |
| 6,300,932 B1 | 10/2001 | Albert |
| 6,323,989 B1 | 11/2001 | Jacobson et al. |
| 6,327,072 B1 | 12/2001 | Comiskey et al. |
| 6,381,372 B1 | 4/2002 | Loce |
| 6,414,661 B1 | 7/2002 | Shen et al. |
| 6,428,189 B1 | 8/2002 | Hochstein |
| 6,437,769 B1 | 8/2002 | Kobayashi et al. |
| 6,439,731 B1 | 8/2002 | Johnson et al. |
| 6,448,951 B1 | 9/2002 | Sakaguchi et al. |
| 6,448,955 B1 | 9/2002 | Evanicky et al. |
| 6,483,643 B1 | 11/2002 | Zuchowski |
| 6,520,646 B2 | 2/2003 | Rodriguez, Jr. et al. |
| 6,590,561 B1 | 7/2003 | Kabel et al. |
| 6,608,614 B1 | 8/2003 | Johnson |
| 6,621,482 B2 | 9/2003 | Fuller |
| 6,631,995 B2 | 10/2003 | Stanton et al. |
| 6,644,832 B2 | 11/2003 | Yoshida et al. |
| 6,654,156 B1 | 11/2003 | Crossland et al. |
| 6,657,607 B1 | 12/2003 | Evanicky et al. |
| 6,680,834 B2 | 1/2004 | Williams |
| 6,683,657 B1 | 1/2004 | Miyawaki |
| 6,728,023 B1 | 4/2004 | Alioshin et al. |
| 6,753,661 B2 | 6/2004 | Muthu et al. |
| 6,796,658 B2 | 9/2004 | Hubel et al. |
| 6,803,901 B1 | 10/2004 | Numao |
| 6,816,141 B1 | 11/2004 | Fergason |
| 6,817,717 B2 | 11/2004 | Childers et al. |
| 6,831,624 B1 | 12/2004 | Harrold |
| 6,831,711 B2 | 12/2004 | Choi et al. |
| 6,863,401 B2 | 3/2005 | Penn |
| 6,888,663 B2 | 5/2005 | Bourdelais et al. |
| 6,891,672 B2 | 5/2005 | Whitehead et al. |
| 6,952,195 B2 | 10/2005 | Arakawa |
| 6,980,195 B2 | 12/2005 | Lonoce et al. |
| 6,985,272 B2 | 1/2006 | Bridgwater et al. |
| 7,002,533 B2 | 2/2006 | Sayag |
| 7,018,046 B2 | 3/2006 | Childers et al. |
| 7,052,138 B2 | 5/2006 | Matsui |
| 7,052,152 B2 | 5/2006 | Harbers et al. |
| 7,053,881 B2 | 5/2006 | Itoh |
| 7,064,740 B2 | 6/2006 | Daly |
| 7,071,907 B1 | 7/2006 | Duboc, Jr. et al. |
| 7,106,505 B2 | 9/2006 | Whitehead et al. |
| 7,118,225 B2 | 10/2006 | Penn |
| 7,125,281 B2 | 10/2006 | Sweetland |
| 7,172,297 B2 | 2/2007 | Whitehead et al. |
| 7,175,281 B1 | 2/2007 | Berman |
| 7,413,309 B2 | 8/2008 | Whitehead et al. |
| 7,532,192 B2 | 5/2009 | Feng |
| 2001/0035853 A1 | 11/2001 | Hoelen |
| 2002/0050958 A1 | 5/2002 | Matthies et al. |
| 2002/0135553 A1 | 9/2002 | Nagai et al. |
| 2002/0159002 A1 | 10/2002 | Chang |
| 2002/0171617 A1 | 11/2002 | Fuller |
| 2003/0048393 A1 | 3/2003 | Sayag |
| 2003/0090455 A1 | 5/2003 | Daly |
| 2003/0137501 A1 | 7/2003 | Richards |
| 2003/0151569 A1 | 8/2003 | Lee et al. |
| 2003/0206245 A1 | 11/2003 | Lin et al. |
| 2004/0012551 A1 | 1/2004 | Ishii |
| 2004/0057017 A1 | 3/2004 | Childers et al. |
| 2004/0218388 A1 | 11/2004 | Suzuki |
| 2005/0083295 A1 | 4/2005 | Daly |
| 2005/0083296 A1 | 4/2005 | Daly |
| 2005/0162737 A1 | 7/2005 | Whitehead et al. |
| 2006/0028156 A1 | 2/2006 | Jungwirth |
| 2006/0092183 A1 | 5/2006 | Malmberg |
| 2006/0125745 A1 | 6/2006 | Evanicky |
| 2006/0139954 A1 | 6/2006 | Kobori |
| 2006/0227085 A1* | 10/2006 | Boldt et al. ............... 345/83 |
| 2006/0232969 A1 | 10/2006 | Bogner et al. |
| 2006/0238723 A1 | 10/2006 | El-Ghoroury |
| 2007/0024576 A1 | 2/2007 | Hassan |
| 2007/0035706 A1 | 2/2007 | Margulis |
| 2007/0097321 A1 | 5/2007 | Whitehead et al. |
| 2007/0126992 A1 | 6/2007 | Penn |
| 2007/0132956 A1 | 6/2007 | Whitehead et al. |
| 2007/0146257 A1 | 6/2007 | Whitehead et al. |
| 2007/0247833 A1 | 10/2007 | Lee et al. |
| 2007/0268211 A1 | 11/2007 | Whitehead et al. |
| 2007/0268224 A1 | 11/2007 | Whitehead et al. |
| 2007/0268577 A1 | 11/2007 | Whitehead et al. |
| 2008/0018985 A1 | 1/2008 | Whitehead et al. |
| 2008/0030449 A1 | 2/2008 | Lee et al. |
| 2008/0043034 A1 | 2/2008 | Whitehead et al. |
| 2008/0043303 A1 | 2/2008 | Whitehead et al. |
| 2008/0074060 A1 | 3/2008 | Ye et al. |
| 2008/0150878 A1 | 6/2008 | Kang |
| 2008/0150879 A1 | 6/2008 | Kang |
| 2009/0175868 A1 | 7/2009 | Ludwig |

FOREIGN PATENT DOCUMENTS

| | | |
|---|---|---|
| EP | 1098291 | 5/2001 |
| EP | 1136874 A1 | 9/2001 |
| EP | 1202244 A1 | 5/2002 |
| EP | 1431653 A2 | 6/2004 |
| EP | 1521235 A2 | 4/2005 |
| JP | 6054120 | 4/1985 |
| JP | 6054174 | 4/1985 |

| | | |
|---|---|---|
| JP | 62234133 | 10/1987 |
| JP | 02162389 A2 | 6/1990 |
| JP | HEI 3-71111 A2 | 3/1991 |
| JP | 31-98026 A1 | 8/1991 |
| JP | 04204591 | 7/1992 |
| JP | 04204591 A2 | 7/1992 |
| JP | 07121120 | 5/1995 |
| JP | 08334742 A1 | 12/1996 |
| JP | 10269802 | 10/1998 |
| JP | 11052412 A | 2/1999 |
| JP | 11064820 | 3/1999 |
| JP | 2000035576 A | 2/2000 |
| JP | 2000214827 | 8/2000 |
| JP | 2000275595 A | 10/2000 |
| JP | 2001100689 A | 4/2001 |
| JP | 2002091385 A | 3/2002 |
| JP | 2002099250 A2 | 4/2002 |
| JP | 2002140338 A | 5/2002 |
| JP | 2004-184852 | 7/2004 |
| JP | 2004-325643 | 11/2004 |
| JP | 2005-520188 | 7/2005 |
| WO | 91-15843 A2 | 10/1991 |
| WO | 96-33483 A1 | 10/1996 |
| WO | 99019767 A1 | 4/1999 |
| WO | 00-40018 A1 | 7/2000 |
| WO | 00-75720 A2 | 12/2000 |
| WO | 01-69584 A1 | 9/2001 |
| WO | 01-69941 A2 | 9/2001 |
| WO | 02-03687 A2 | 1/2002 |
| WO | 02/069030 | 9/2002 |
| WO | 02-069030 A2 | 9/2002 |
| WO | 02-079862 A2 | 10/2002 |
| WO | 03077013 A2 | 9/2003 |
| WO | 2004031844 A1 | 4/2004 |
| WO | 2005-101309 A1 | 10/2005 |
| WO | 2006-010244 A1 | 2/2006 |
| WO | 2006115852 | 11/2006 |

OTHER PUBLICATIONS

Endo, N., "Transparent LCD Devices", Toshiba Technology Presentation Collection, Apr. 4, 1996, p. 175 Japan.

Funamoto, et al., "High-Picture-Quality Technique for LCD Televisions: LCD-AI", FMC6-4 (Late-News Paper) pp. 1157-1158 (2000).

Funamoto, T., et al., "Technology for LCD Televisions with High Image Quality" Matsushita Technical Journal, vol. 46, No. 3, Jun. 2000.

Int'l Searching Authority/US, "Int'l Search Report and Written Opinion", Int'l Appln. No. PCT/US07/02788.

Mitsuhashi, Y., (Sharp Corporation Electronic Components Group Display Div.) "Recent Developments in LED Back Light Devices", Television Technology Institute Reports, Feb. 25, 1986, pp. 15-20 Japan.

Mitsuhashi, Y., "Regarding LED Backlight Systems for LCDs", Tech. Rep. Inst. Television Eng., Feb. 25, 1986.

Ohara, A., "Backlight for Liquid Crystal Displays", Special Section: Display Materials and Their Applications, J. Illum. Engng. Inst., Japan, vol. 73, No. 12, 1989, pp. 46-52.

Suzuki, Y., "Liquid Crystal Applications", Tech. Rep. Inst. Television Eng., 1983 SID International Symposium Session VI, Jul. 28, 1983.

Ward, Greg, "A Wide Field, High Dynamic Range", Sterographic Viewer, Apr. 2002.

Ward, Greg, "A Wide Field, High Dynamic Range", Stereographic Viewer, Apr. 2002.

* cited by examiner

CALIBRATION OF DISPLAYS HAVING SPATIALLY-VARIABLE BACKLIGHT

CROSS REFERENCE TO RELATED APPLICATION

This application claims the benefit of U.S. Provisional application Ser. No. 60/899,098 filed Feb. 1, 2007 and entitled CALIBRATION OF DISPLAYS HAVING SPATIALLY-VARIABLE BACKLIGHT which is hereby incorporated herein by reference in its entirety.

TECHNICAL FIELD

The invention relates to calibration of displays for displaying digital images.

BACKGROUND

Some types of displays for displaying digital images comprise a plurality of individually-controllable light sources. Examples of such displays include those described in International Application No. PCT/CA03/00350, which is hereby incorporated by reference herein. Such displays may use light emitting diodes (LEDs) as the individually-controllable light sources, for example.

One problem with using LEDs as light sources is that the amount of light emitted at a specific driving current level can vary significantly between individual LEDs. This variation can result from manufacturing process variations. Further, the amount of light that an individual LED will produce for any given driving current tends to slowly decrease in an unpredictable manner as the LED ages.

It may therefore be desirable to provide a mechanism for calibrating a display which employs individually-controllable light sources to compensate for differences in brightness between different ones of the light sources. Some such calibration mechanisms are described in the above-noted International Application No. PCT/CA03/00350.

Another problem associated with some LEDs is that the color spectrum of the emitted light can vary between individual LEDs. For example, some types of white LEDs comprise a blue LED which illuminates a yellow phosphor. Individual ones of such LEDs may, when driven to emit white light, emit light having a color spectrum (also referred to as a "color temperature") ranging from "blue white" to "yellow white". Such variation in the color temperature among LEDs is undesirable in many situations.

There exists a need for further methods and systems for calibrating a display comprising a plurality of individually-controllable light sources.

SUMMARY OF THE INVENTION

One aspect of the invention provides a method for calibrating a display comprising an array of individually-controllable light sources coupled to a controller. The individually-controllable light sources are configured to emit light when supplied with electrical current under control of the controller in response to image data. The method comprises collecting at least a portion of light emitted by one light source of the plurality of light sources, receiving a collected light signal representative of the collected light, comparing the collected light signal to expected light characteristics, and, if the comparison indicates that an intensity of the collected light is different from an expected intensity indicated by the expected light characteristics, determining an intensity correction for the one light source, the intensity correction comprising an indication to alter a duty cycle of pulses of electrical current supplied to the one light source by the controller.

Further aspects of the invention and features of specific embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention provides systems and methods for calibrating a display comprising an illuminator comprising a plurality of individually-controllable light sources. The illuminator may backlight a screen. In some embodiments, the light output of each of the individually-controllable light sources is measured and compared with an expected light output. When a measured output of one light source differs from the expected output of the light source, a correction may be determined for that light source. The determined correction may comprise an indication to adjust illuminator control signals to be provided to that light source and/or neighboring light sources. The illuminator control signals may, for example, directly or indirectly control one or more of driving current, driving waveform, duty cycle of a driving waveform, wave shape of a driving waveform, or the like.

In some embodiments, the screen may comprise a modulator comprising a plurality of individually-controllable pixel elements. In such embodiments, the determined correction may additionally or alternatively comprise an indication to adjust modulator control signals for portions of the modulator which are backlit by that light source. The modulator control signals may, for example, control a transmissivity of one or more pixel elements, times at which the one or more pixel elements are made to pass light from the illuminator, or the like.

Once the corrections have been determined, they may be applied by adjusting illuminator and/or modulator control signals generated from image data. The corrections may also be applied when generating the illuminator and/or modulator control signals from the image data. Alternatively, the corrections may be stored in an electronic memory or other suitable storage system for future application.

Figure 1A:
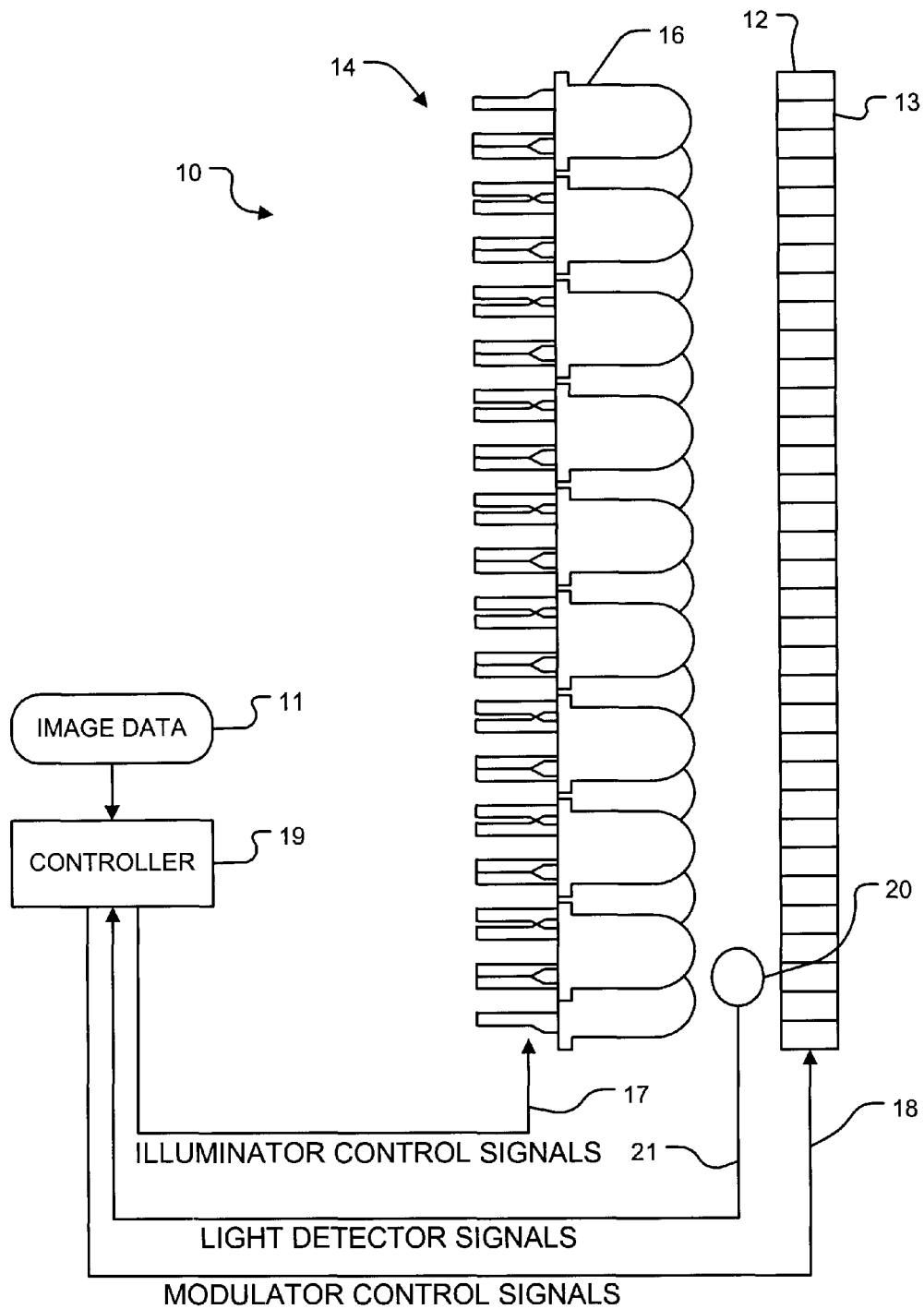
FIGS. 1A and 1B show displays having calibration mechanisms which collect forward-emitted light.

FIG. 1A shows a display 10 comprising a modulator 12 which is backlit by an illuminator 14 comprising an array of individually-controllable light sources 16. Modulator 12 comprises a plurality of pixel elements 13. Pixel elements 13 may be individually controlled to selectively modulate light from light sources 16. In the illustrated embodiment, light sources 16 comprise light-emitting diodes (LEDs). In the following description, light sources 16 are referred to as LEDs 16 and modulator 12 is referred to an LCD panel. Other suitable light sources could be used in place of LEDs 16. Other suitable modulators could be used in place of LCD panel 12. The light output of each LED 16 and the modulation of each pixel element 13 may be controlled individually as described, for example, in International Application No. PCT/CA03/00350.

A controller 19 generates illuminator control signals 17 and modulator control signals 18 to display a desired image. The desired image may be specified by image data 11 which directly or indirectly specifies luminance values (and, if the image is a color image, color values) for each pixel. Image data 11 may have any suitable format and may specify luminance and color values using any suitable color model. For example, image data 11 may specify:

red, green and blue (RGB) color values for each pixel;
YIQ values wherein each pixel is represented by a value (Y) referred to as the luminance and a pair of values (I, Q) referred to as the chrominance;
CMY or CMYK values;
YUV values;
YCbCr values;
HSV values; or
HSL values.

Image data 11 may have any suitable image data format.

In some embodiments, light sources 16 may comprise LEDs of different colors, or may comprise tri-color LEDs which each include red, green and blue LEDs all encapsulated within a single housing. In such embodiments, illuminator control signals 17 may cause suitable driving circuits to separately control the brightness of LEDs 16 of different colors and, within a particular color, to separately control the brightness of LEDs 16 in different locations. This permits illuminator 14 to project onto modulator 12 a pattern of light that has different mixtures of colors at different locations on modulator 12, or to sequentially project red, green and blue color patterns onto modulator 12 in a time-interleaved manner.

In the embodiment of FIG. 1A, controller 19 receives image data 11 and generates illuminator control signals 17 which control the intensities of LEDs 16 based on image data 11. Controller 19 also generates modulator control signals 18 which control the amounts of light passed by each of pixel elements 13. Modulator control signals 18 may also control the spectrum of light passed by each of pixel elements 13 in some embodiments.

Modulator control signals 18 may be generated, for example, based on the intensities and spread functions of LEDs 16. The spread function of an LED 16 represents a pattern of light from that LED 16 which is incident on modulator 12. The intensities and spread functions of LEDs 16 may be used in a light field simulation to obtain an expected illumination pattern created by illuminator 14 on modulator 12. The light field simulation may then be used to determine the amount of light which should be passed by each of pixel elements 13 to display the desired image. Where the desired image is a color image, the light field simulation may also be used to determine the amount of color filtration (if any) which should be applied by each of pixel elements 13 to display the desired image.

In the embodiment of FIG. 1A, a light detector 20 detects light emitted by LEDs 16 and provides light detector signals 21 to controller 19. Light detector signals 21 may indicate the intensity of light emitted by LEDs 16 that is detected at light detector 20. Light detector 20 may additionally or alternatively comprise a spectrometer, in which case light detector signals 21 may indicate the spectral characteristics of light emitted by LEDs 16.

Figure 1B:
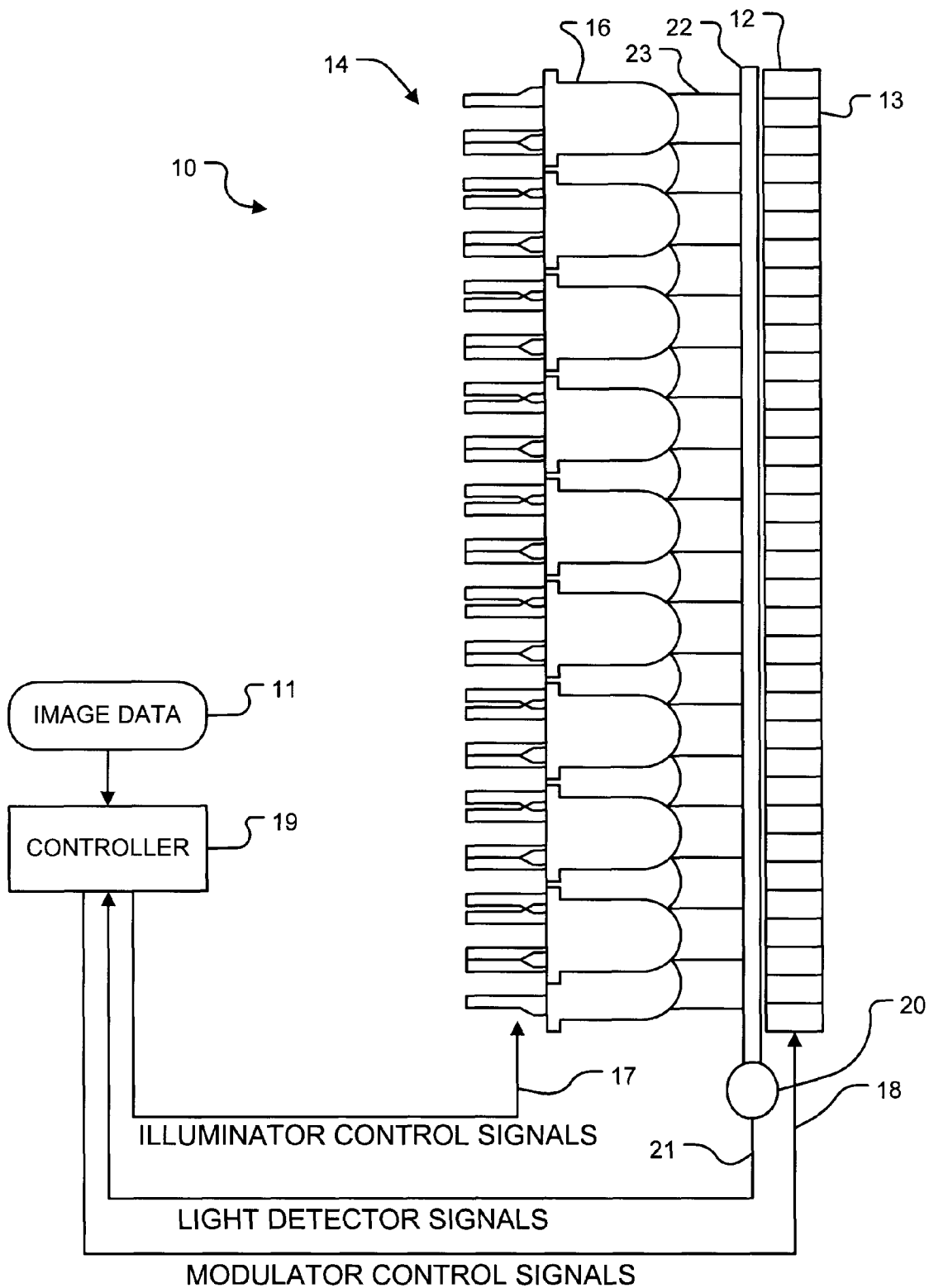

In the embodiment of FIG. 1A, a single light detector 20 is provided which may be moved into different positions for capturing forward-emitted light from different LEDs 16. In the alternative, multiple light detectors may be provided, or a suitable optical system may be provided to direct light from LEDs 16 to light detector 20. For example, FIG. 1B shows an embodiment similar to that of FIG. 1A wherein a planar optical waveguide 22 collects a small fraction of the forward-emitted light emitted by LEDs 16 and carries that light to light detector 20. The embodiment of FIG. 1B also comprises a grid 23 of reflective-walled channels for increasing the uniformity with which each LED 16 illuminates modulator 12, as described, for example, in International Application No. PCT/CA03/00350.

FIGS. 1A and 1B are schematic in nature. The components of modulator 12 and light sources 16 may be arranged in any suitable two dimensional arrangements, not necessarily the arrangements shown.

Figure 2A:
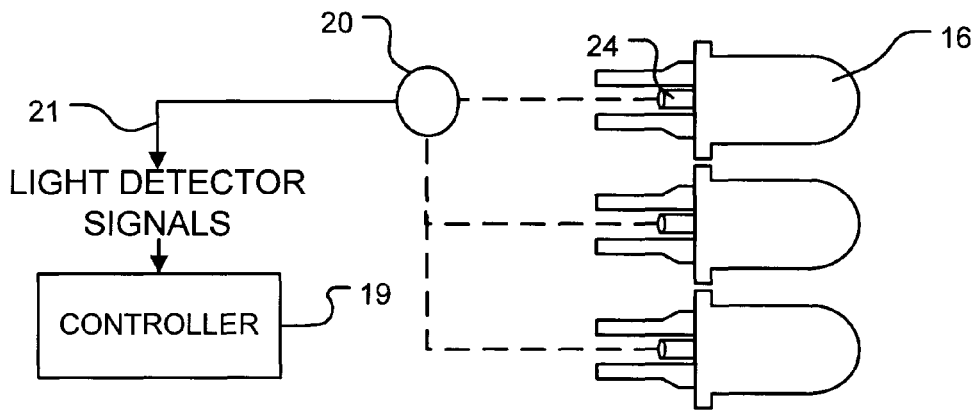
FIGS. 2A-C show example calibration mechanisms which collect stray light.
Figure 2B:
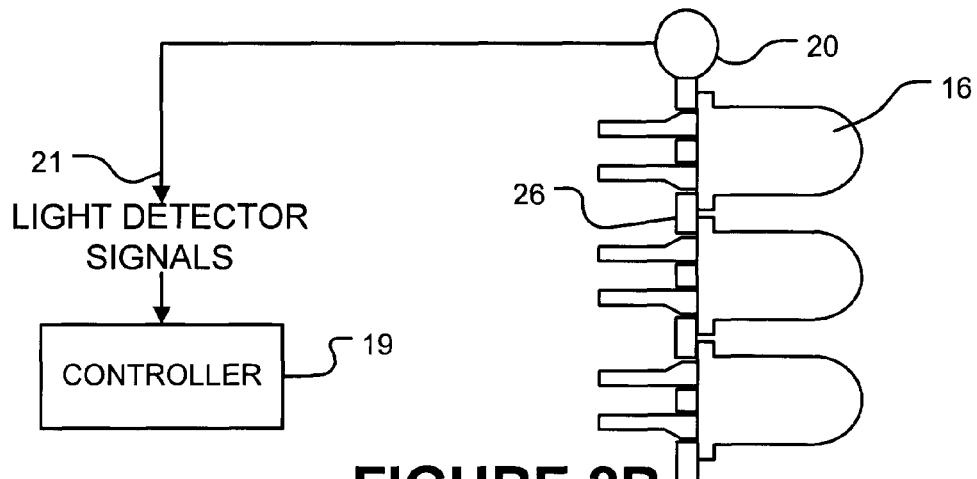
Figure 2C:
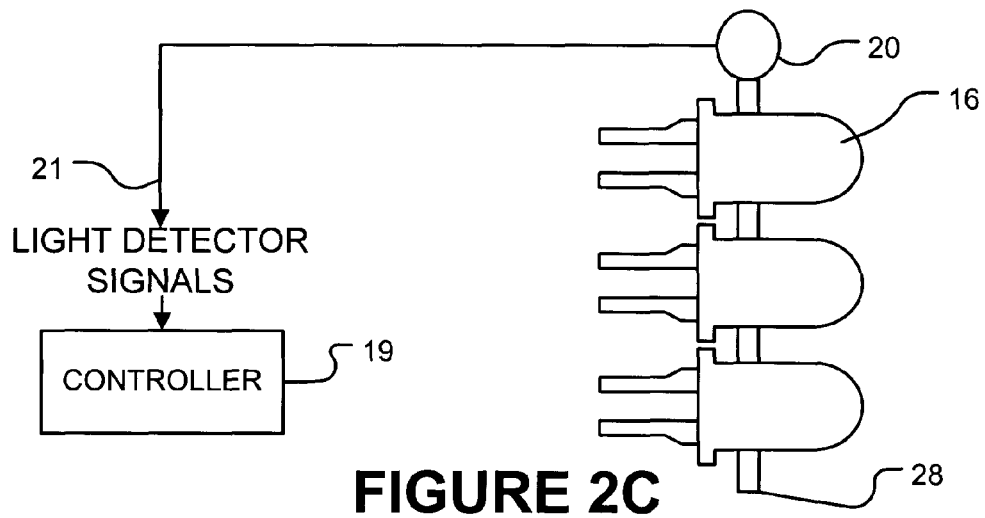

FIGS. 2A-C show embodiments wherein light detector 20 detects stray light emitted by LEDs 16. In the FIG. 2A embodiment, optical waveguides 24 carry stray light from LEDs 16 to light detector 20. Only a small fraction of the light emitted by each LED 16 is captured by waveguides 24. As long as the coupling between a waveguide 24 and the corresponding LED 16 does not change, the proportion of the light emitted by an LED 16 which is captured by waveguide 24 remains constant. One light detector 20 or a few light detectors 20 may be located at convenient locations such as at edges of illuminator 14.

In the embodiment of FIG. 2B, individual optical waveguides 24 are replaced by a planar optical waveguide 26. Power leads for LEDs 16 pass through holes in waveguide 26. One or more light detectors 20 are located at edges of optical waveguide 26. Light emitted in the rearward direction by any of LEDs 16 is trapped within optical waveguide 26 and detected by light detector(s) 20. In the embodiment of FIG. 2C, a planar optical waveguide 28 collects light emitted by LEDs 16 in sideways directions and carries that light to one or more light detectors 20.

Figure 3A:
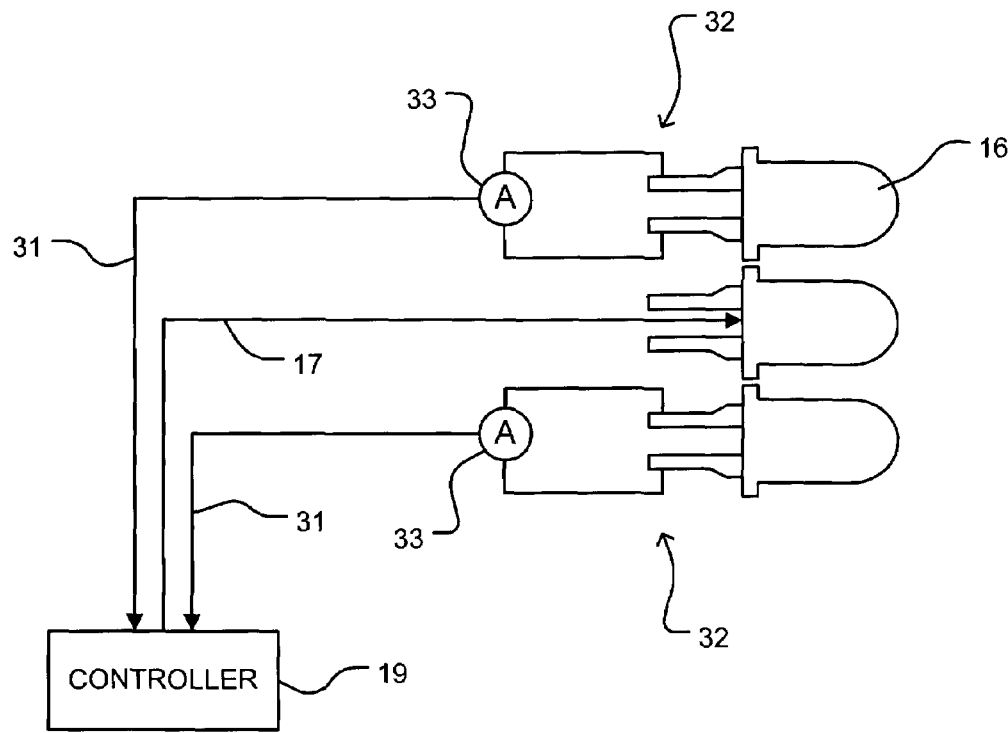
FIG. 3A shows a calibration mechanism which detects stray light from one light source using one or more nearby light sources as light detectors.

FIG. 3A shows an embodiment wherein stray light from one LED 16 is collected by nearby LEDs 16. When stray light from one LED 16 which is emitting light in response to illuminator control signals 17 is incident on an LED 16 which is not emitting light, an electrical potential is induced in that non-emitting LED 16.

Each LED 16 may be connected to a circuit 32. Only circuits 32 connected to non-emitting LEDs 16 are shown in FIG. 3. The electrical potential induced by light incident on a non-emitting LED 16 may cause a current which is proportional to the intensity of the light incident thereon to flow in the connected circuit 32. The current flowing in circuits 32 may be measured by current detectors 33 which provide feedback signals 31 to controller 19. Controller 19 may determine the light output of the one LED 16 based on feedback signals 31 from other LEDs 16. Alternatively, circuits 32 may be connected to controller 19, and controller 19 may comprise one or more built-in current detector(s) for measuring current produced by non-emitting LEDs 16. In such embodiments, controller 19 may determine the light output of the one LED 16 based on the current measurements. Such current measurements may be made at times when only one LED 16 is emitting light which is incident on the non-emitting LEDs 16 for which current is measured, or when a known set of two or more LEDs 16 are emitting light, such that the contribution from each of the emitting LEDs 16 may be individually determined. The contribution from each of the emitting LEDs 16 may be individually determined, for example, by triangulation, using a plurality of non-emitting LEDs 16 having a known geometric relationship to the emitting LEDs 16 to sense light from the emitting LEDs 16. A separate light detector 20 is not required in the FIG. 3A embodiment.

Figure 3B:
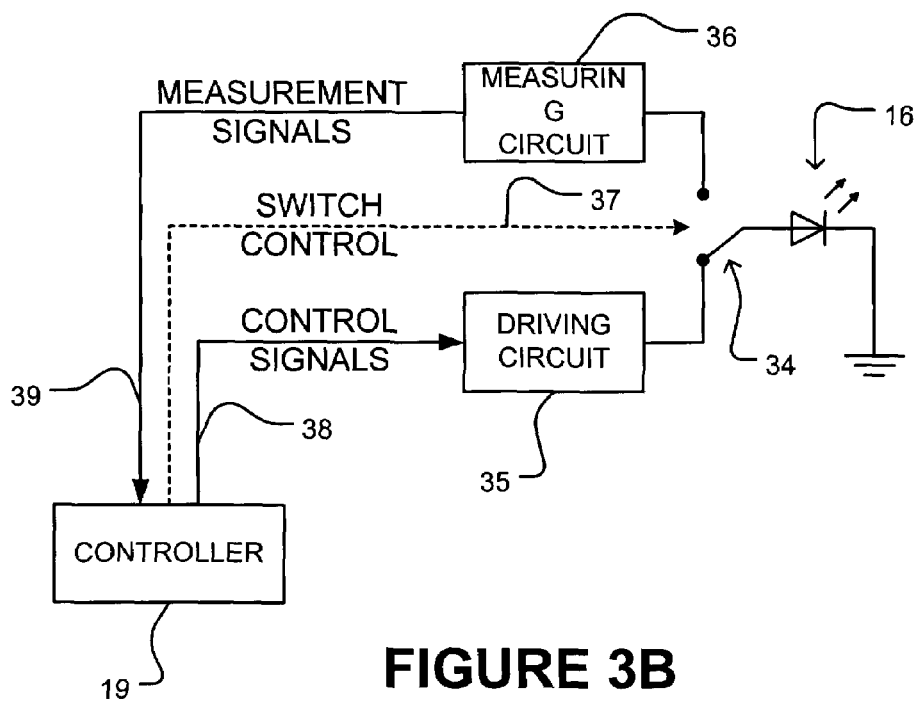
FIG. 3B is a block diagram of an example circuit for selectively causing a light source to emit light or detect light.

FIG. 3B shows an embodiment wherein a switch 34 is provided for selectively connecting LED 16 to a driving circuit 35 or a measuring circuit 36. Switch 34 may be operated between a driving position and a measuring position by controller 19 by means of a switch control line 37. When switch 34 is in the driving position, LED 16 is driven to emit light by driving circuit 35 in response to control signals 38 from controller 19. Measuring circuit 36 may provide a reverse bias to LED 16, and may be configured such that current drawn by LED 16 varies with the amount of light incident on LED 16. When switch 34 is in the measuring position, current flow through LED 16 may be measured by measuring circuit 36, which provides measurement signals 39 to controller representative of light incident on LED 16.

Figure 4:
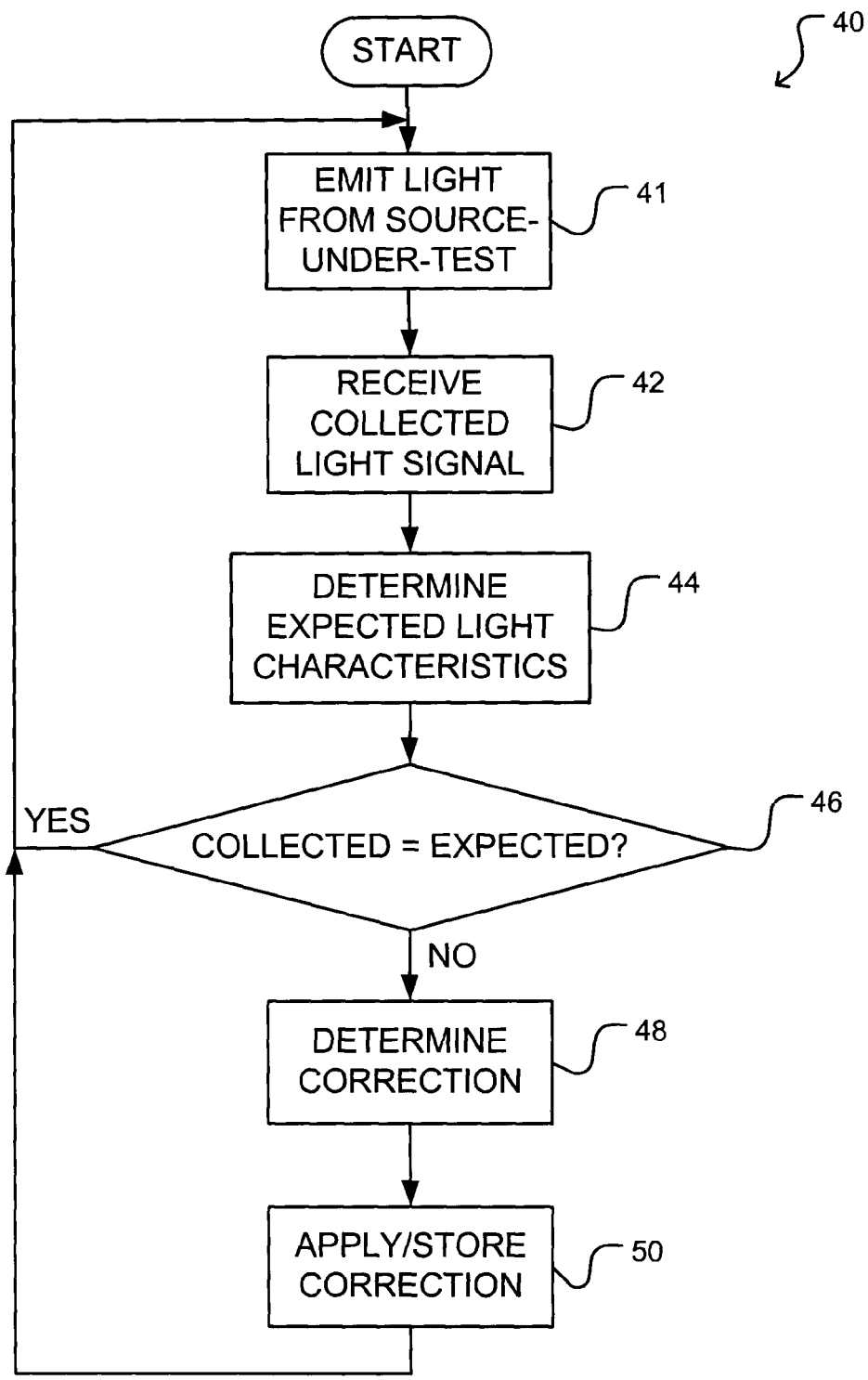
FIG. 4 is a flowchart illustrating steps of a method for calibrating a display according to one embodiment of the invention.

FIG. 4 is a flowchart illustrating a method 40 for calibrating a display according to one embodiment of the invention. Method 40 may be carried out by a controller of a display which is backlit by a plurality of individually-controllable light sources, such as, for example, a display according to any of the embodiments of FIGS. 1A-B, 2A-C or 3A-B. Method 40 may also have application to other types of displays which comprise a plurality of individually-controllable light sources.

At block 41, the controller causes one of the light sources, which is referred to herein as a source-under-test, to emit light. The source-under-test may emit light in the course of displaying an image, or in response to a calibrating illuminator control signal.

In some situations, the controller may cause only the source-under-test to emit light. In such situations the emitted light may be detected by a light detector upon which the emitted light is incident, or may be collected by any suitable optical system and provided to a light detector. Alternatively, in embodiments wherein the light sources comprise LEDs, the emitted light may be detected by neighboring LEDs.

In other situations, the controller may cause one or more light sources other than the source-under-test to emit light. In such situations, light emitted by the source-under-test may be detected by a light detector positioned such that only light from the source-under-test is incident thereupon, or may be collected by an optical system configured to collect only light emitted by the source-under-test and provided to a light detector.

At block 42, the controller receives a collected light signal. The collected light signal may comprise one or more light detector signals received from one or more light detectors. Alternatively or additionally, the collected light signal may comprise one or more feedback signals received from LEDs. The collected light signal may indicate the intensity of light emitted from source-under-test. In some embodiments, the collected light signal also indicates the color temperature of light emitted from the source-under-test.

The collected light signal may represent light collected during a calibration cycle wherein the source-under-test is provided with a calibrating illuminator control signal. Alternatively, the collected light signal may represent light collected while the display is displaying an image wherein the source-under-test is provided with an illuminator control signal determined by image data.

At block 44 the controller determines expected light characteristics for the collected light represented by the collected light signal. Determining the expected light characteristics may comprise, for example, looking up stored reference values for the source-under-test. The expected light characteristics may comprise, for example, intensity levels and/or spectral characteristics expected for given illuminator control signals. The reference values may be stored, for example, in a memory accessible by the controller.

At block 46 the controller compares the collected light signal with the expected light characteristics. If the collected light signal indicates that the light emitted by the source-under-test has the expected characteristics (block 46 YES output), then no correction is required. Method 40 may then return to block 41 in order to calibrate other light sources, or may end if all light sources have been calibrated.

If the collected light signal indicates that the light emitted by the source-under-test does not have the expected characteristics (block 46 NO output), then a correction may be required. Method 40 then proceeds to block 48.

At block 48, the controller determines a correction to be applied based on the results of the comparison of block 46. For example, if the comparison indicates that the intensity of the light emitted by the source-under-test is different from the expected intensity, the controller may determine an intensity correction for the source-under-test and store the intensity correction in a data structure located in a memory accessible by the controller. Likewise, if the comparison indicates that the color temperature of the source-under-test differs from the expected color temperature, the controller may determine a color correction for the source-under-test and store the color correction in a data structure located in a memory accessible by the controller.

If the comparison indicates that the intensity of the light emitted by the source-under-test is less than the expected intensity, the intensity correction may comprise, for example, an indication to adjust the illuminator control signals such that an increased current is provided to the source-under-test. Alternatively or additionally, the intensity correction may comprise an indication to adjust the illuminator control signals such that an increased voltage is provided to the source-under-test.

Figure 5A:
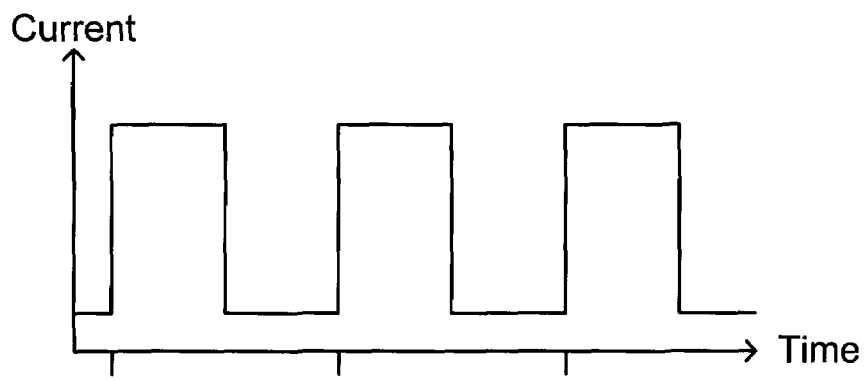
FIG. 5A illustrates an uncalibrated pulse of electrical power supplied to drive a light source.
Figure 5B:
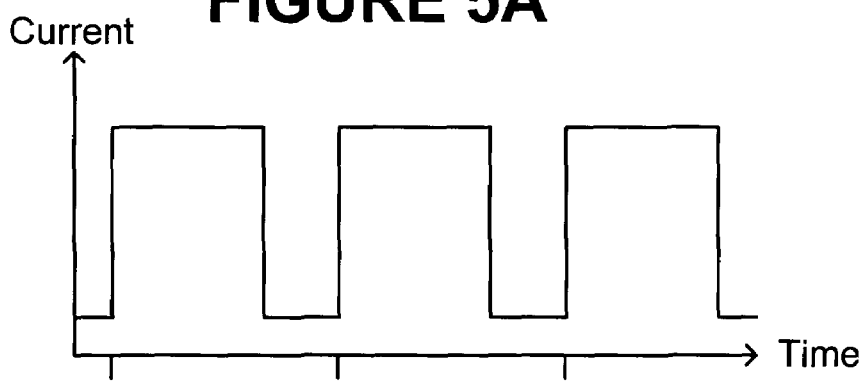
FIG. 5B illustrates an calibrated pulse of electrical power supplied to drive a light source; and, FIG. 6 shows an example arrangement of light sources.

In some embodiments the light sources are provided with pulses of electrical power, rather than provided with a continuous supply of power. For each light source, the duty cycle of the pulses determines the perceived intensity of light emitted from that light source. The term "duty cycle" is used herein to refer to the proportion of time during which electrical power is supplied to a light source. FIG. 5A shows example illuminator control signals for providing pulses of electrical power to a light source wherein the light source emits light at full intensity for 50% of the time, which corresponds to a duty cycle of 50%. The time scale of the pulses is such that the human eye perceives the light source to be continuously emitting light at 50% intensity. In such embodiments, the intensity correction may comprise an indication to adjust the illuminator control signals such that the electrical pulses provided to the source-under-test have increased or decreased duty cycles. FIG. 5B shows an example of such adjusted illuminator control signals for a situation wherein the source-under-test is determined to have a 33% reduction in intensity, and the illuminator control signals have been adjusted to increase the duty of the pulses by 33%, resulting in an adjusted duty cycle of 66.5%.

Figure 6:
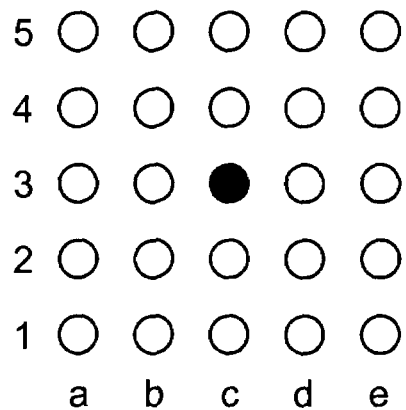

Instead of or in addition to an indication to adjust the illuminator control signals for the source-under-test, the intensity correction may comprise an indication to adjust the illuminator control signals for other light sources in an area surrounding the source-under-test. FIG. 6 shows an example arrangement of light sources which comprises a portion of a rectangular array. The columns and rows of the light sources shown in FIG. 6 have been labelled with reference letters a-e and numbers 1-5, respectively. In the FIG. 6 embodiment, if the intensity of light source c3 is less than the expected intensity, the intensity correction may comprise, for example, an indication to increase the current, voltage and/or duty cycle of electrical power provided to light sources c2, c4, b3 and d3. The intensity correction may also comprise an indication to adjust the illuminator control signals for light sources b2, b4, d2 and d4, or for light sources farther away from light source c3.

In some embodiments, the intensity correction comprises an indication to adjust the illuminator control signals for light sources in an area surrounding the source-under-test in a non-uniform manner. For example, the illuminator control signals for surrounding light sources may be non-uniformly adjusted according to a weighting function. The weighting function may be based, for example, on the intensities of the surrounding light sources, or the similarity of the intensities of the surrounding light sources to the expected intensity of the source-under-test. One factor which may be included in the weighting function is the spatial distribution of light from the source-under-test. The intensity correction may be generated based on weighting the measured intensity by the spatial distribution. The spatial distribution may be, for example, a point-spread-function used in the image processing for the display.

For example, in the FIG. 6 embodiment, if the intensity of light source c3 is less than the expected intensity, the intensity correction may comprise, for example, an indication to increase the current, voltage and/or pulse width of electrical power provided to one or more light sources within a predetermined proximity to light source c3 which have the highest intensity. For example, if light source a1 has a relatively high intensity as compared to the other light sources surrounding light source c3, the intensity correction may comprise an indication to increase the current, voltage and/or pulse width of electrical power provided to light source a1 without adjusting the illuminator control signals for light sources located closer to light source c3. Alternatively, the intensity correction may comprise, for example, an indication to increase the current, voltage and/or pulse width of electrical power provided to one or more light sources within a predetermined proximity to light source c3 which have an intensity value closest to the expected intensity of light source c3.

In embodiments where the light sources comprise an array of evenly spaced LEDs, the intensity correction may comprise an indication to adjust the control signals so that for sources at the same distance away from a non-emitting LED connected to a measuring circuit, the non-emitting LED senses the same intensity. Multiple sources the same distance from the non-emitting LED can be calibrated to emit uniformly. Then another non-emitting LED can detect the intensities of these calibrated LEDs, and use the detected intensities as reference intensities. That other non-emitting LED may then be used to detect intensities from other sources at the same distance from it as the calibrated LEDs, and calibrate those other sources based on the reference intensities. This process can be carried out over the entire LED array to make the LEDs emit uniformly without calibrating for the sensitivity of each LED as a detector. An analogous process can be used to calibrate for the sensitivity of each LED as a detector once LEDs are calibrated to emit uniformly. Thus subsequently the sensitivity of LEDs as detectors can be used without repeating the aforementioned process.

In addition to or instead of an intensity correction, at block 48 the controller may determine that a color correction is required for the source-under-test. The determination that a color correction is required may be made, for example, by providing illuminator control signals to drive the source-under-test to emit white light, measuring the spectrum of the emitted light, and comparing the measured spectrum to an expected spectrum. The expected spectrum may comprise, for example, a predefined spectrum such as the D65 white point specified by ITU Recommendation BT.709.

In embodiments where the light sources comprise color light sources, the color correction may comprise an indication to adjust the color values used to generate the illuminator control signals for the source-under-test to compensate for any deviation from the expected color temperature. Alternatively or additionally, the color correction may comprise an indication to adjust the color values used to generate the modulator control signals for portions of the modulator on which light from the source-under-test is incident. Such adjustment of the modulator control signals may be determined, for example, by substituting the measured color temperature for the source-under-test for the expected color temperature to calculate a color-calibrated spread function for the source-under-test. The color-calibrated spread function may then be included in the light field simulation, such that the modulator applies color filtration to correct the color temperature perceived by a viewer of the displayed image. In embodiments which use RGB color values, the adjustment to the color values may be determined, for example, by normalizing the measured spectrum by the minimum of the red, green and blue color channels.

After the correction has been determined at block 48, the correction may be applied at block 50. Applying the correction may comprise adjusting the illuminator and/or modulator control signals as indicated by the correction. The correction may also be stored at block 50. Storing the correction may comprise storing the correction in an electronic memory accessible by the controller. The controller may apply the corrections as they are determined, or may store a plurality of corrections and apply the stored corrections at a subsequent time.

Method 40 may be carried out sequentially for each of the plurality of light sources. For example, when the display is being driven to display a series of frames specified by the image data, method 40 may be carried out for one of the light sources during each frame until every light source has been calibrated. Alternatively, method 40 may be simultaneously carried out for more than one of the light sources. For example, a plurality of collected light signals may be received at block 42 which are representative of light collected from a subset of the light sources, or all of the light sources. In embodiments wherein the collected light signals are received for a subset of the light sources, method 40 may be repeated for every other subset of the light sources.

Method 40 may be automatically carried out periodically, or may be carried out in response to a calibration command received by the controller. Alternatively or additionally, data from the display may be continually or periodically measured, and method 40 may be carried out in response to the measured data exceeding the threshold. The measured data may comprise, for example, thermal data.

As will be apparent to those skilled in the art in the light of the foregoing disclosure, many alterations and modifications are possible in the practice of this invention without departing from the spirit or scope thereof. For example:

Instead of receiving the collected light signals at the controller which provides the illuminator and modular control signals, a separate calibration controller may be provided to receive the collected light signals and determine any corrections to be applied.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for calibrating a display comprising an array of individually-controllable light sources coupled to a controller, the individually-controllable light sources configured to emit light when supplied with electrical current under control of the controller in response to image data, the method comprising:
    collecting at least a portion of light emitted by one light source of the plurality of light sources;
    generating a collected light signal representative of the collected light, wherein the representative collected light signal comprises an electrical signal generated by at least one other light source of the plurality of light sources in response to the collected light;
    comparing the representative collected light signal to expected light characteristics; and,
    if the comparison indicates that an intensity of the collected light is different from an expected intensity indicated by the expected light characteristics, determining an intensity correction for the one light source, the intensity correction comprising an indication to alter a duty cycle of pulses of electrical current supplied to the one light source by the controller.

2. A method according to claim 1 wherein the at least one other light source comprises at least one non-emitting light source, and wherein receiving the representative collected light signal comprises measuring current in at least one circuit connected to the at least one other light source.

3. A method according to claim 1 wherein the representative collected light signal is received from a plurality of neighboring light sources located in an area surrounding the one light source.

4. A method according to claim 1 wherein if the comparison indicates that the intensity of the collected light is lower than the expected intensity, the method comprises:
    applying the intensity correction by increasing the duty cycle of pulses supplied to the one light source when displaying an image specified by the image data.

5. A method according to claim 1 wherein if the comparison indicates that the intensity of the collected light is greater than the expected intensity, the method comprises:
    applying the intensity correction by decreasing the duty cycle of pulses supplied to the one light source when displaying an image specified by the image data.

6. A method according to claim 1 comprising:
    storing the intensity correction in an electronic memory accessible by the controller.

7. A method according to claim 1 wherein collecting at least a portion of light emitted by the one light source comprises collecting light for one frame of image data, the method further comprising applying the intensity correction by altering the duty cycle of a next pulse of electrical power when displaying a next frame of image data.

8. A method according to claim 7 comprising calibrating each of the plurality of light sources during a frame.

9. A method according to claim 7 comprising calibrating a subset of the plurality of light sources during a frame.

10. A method according to claim 7 comprising calibrating each of the plurality of light sources over a plurality of frames.

11. A method according to claim 7 comprising periodically calibrating each of the plurality of light sources.

12. A method according to claim 7 comprising calibrating one or more of the plurality of light sources in response to a calibration command received by the controller.

13. A method according to claim 7 comprising measuring data from the display and calibrating one or more of the plurality of light sources when the measured data exceeds a predetermined threshold.

14. A method according to claim 13 wherein the measured data comprises thermal data.

15. A method according to claim 1 wherein the intensity correction comprises an indication to adjust an intensity of light emitted by at least one neighboring one of the plurality of light sources.

16. A method according to claim 15 wherein the intensity correction comprises an indication to adjust the intensity of two or more neighboring light sources by different amounts.

17. A method according to claim 16 wherein the indication to adjust the intensity of light emitted by the two or more neighboring light sources comprises differentially adjusting the intensity of the two or more neighboring light sources according to a weighting function.

18. A method according to claim 17 wherein the weighting function is based on expected intensities of the neighboring light sources.

19. A method according to claim 17 wherein the weighting function is based on a comparison of intensities of the neighboring light sources to a desired intensity of the one light source.

20. A method according to claim 1 comprising:
    if the comparison indicates that a color temperature of the collected light is different from an expected color temperature indicated by the expected light characteristics, determining a color correction for the one light source.

21. A method according to claim 20 wherein the color correction comprises an indication to adjust color values determined by the controller in response to the image data prior to supplying the one light source with electrical power.

22. A method according to claim 20 wherein the screen comprises a modulator comprising a plurality of individually-controllable pixel elements which each pass a controllable amount and spectrum of light under control of the controller, and wherein the color correction comprises an indication to adjust the spectrum of light passed by ones of the plurality of individually-controllable pixel elements upon which light from the one light source is incident.

23. A method according to claim 20 comprising:
    applying the color correction when displaying an image specified by the image data.

24. A method according to claim 20 comprising:
    storing the color correction in an electronic memory accessible by the controller.

25. A method for calibrating a display comprising a screen backlit by an array of individually-controllable light sources coupled to a controller, each of the individually-controllable light sources configured to emit light when supplied with electrical power under control of the controller in response to image data, the method comprising:
- collecting at least a portion of light emitted by one light source of the plurality of light sources;
- generating a collected light signal representative of the collected light, wherein the representative collected light signal comprises an electrical signal generated by at least one other light source of the plurality of light sources in response to the collected light;
- comparing the representative collected light signal to expected light characteristics; and,
- if the comparison indicates that a color temperature of the collected light is different from an expected color temperature indicated by the expected light characteristics, determining a color correction for the one light source.

26. A method according to claim 25 wherein the screen comprises a modulator comprising a plurality of individually-controllable pixel elements which each pass a controllable amount and spectrum of light under control of the controller, and wherein the color correction comprises an indication to adjust the spectrum of light passed by ones of the plurality of individually-controllable pixel elements upon which light from the one light source is incident.

27. A method according to claim 25 comprising:
applying the color correction when displaying an image specified by the image data.

28. A method according to claim 25 comprising:
storing the color correction in an electronic memory accessible by the controller.

29. A method for calibrating a display comprising a modulator backlit by an array of individually-controllable light sources coupled to a controller, the individually-controllable light sources configured to emit light when supplied with electrical current under control of the controller in response to image data, the method comprising:
- collecting at least a portion of light emitted by one light source of the plurality of light sources;
- generating a collected light signal representative of the collected light, wherein the representative collected light signal comprises an electrical signal generated by at least one other light source of the plurality of light sources in response to the collected light
- comparing the representative collected light signal to expected light characteristics; and,
- if the comparison indicates that an intensity of the collected light is different from an expected intensity indicated by the expected light characteristics, determining an intensity correction for the one light source, the intensity correction comprising an indication to adjust an intensity of at least one neighboring light source and to adjust transmission characteristics of a corresponding section of the modulator.

* * * * *